United States Patent

Hirst

[15] 3,680,888
[45] Aug. 1, 1972

[54] VEHICLE SUSPENSIONS
[72] Inventor: Archie John Hirst, Leicester, England
[73] Assignee: The Dunlop Company, Limited, London, England
[22] Filed: July 28, 1970
[21] Appl. No.: 58,911

[52] U.S. Cl. .............................. 280/124 R, 267/63 A
[51] Int. Cl. ................................................ B60g 11/22
[58] Field of Search ................... 267/63 A; 280/124

[56] References Cited

UNITED STATES PATENTS 2,739,821  3/1956  Hickman ................. 267/63 A X
2,802,662  8/1957  Hirst ....................... 267/63 A X Primary Examiner—Philip Goodman
Attorney—Harness, Dickey & Pierce

[57] ABSTRACT

A suspension system for a vehicle in which the spring units each comprise interleaved rubber blocks and metal plates wherein the spring units are arranged to overlap about the longitudinal center line of the axleboxes to form a compact suspension with controlled lateral and vertical stiffness, of which the following is a specification.

6 Claims, 7 Drawing Figures

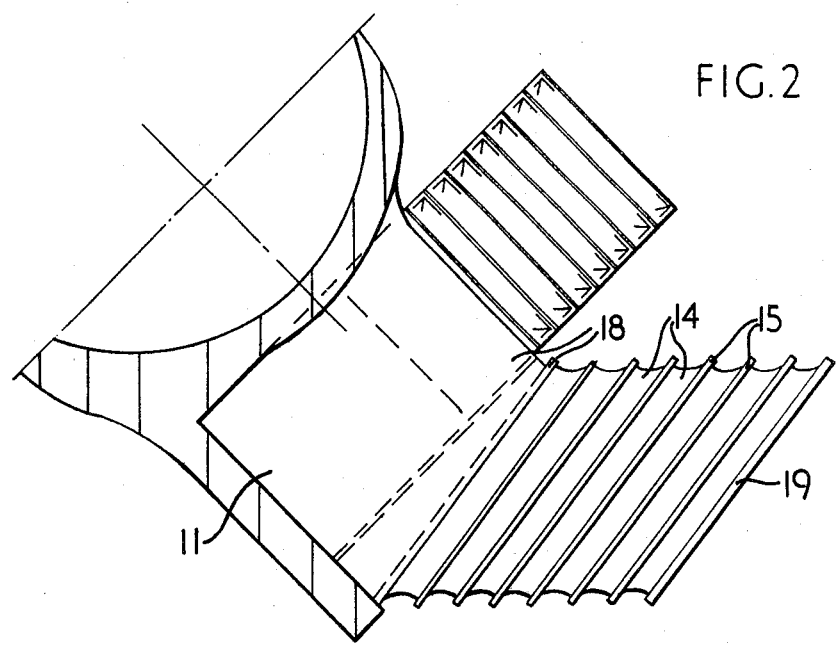

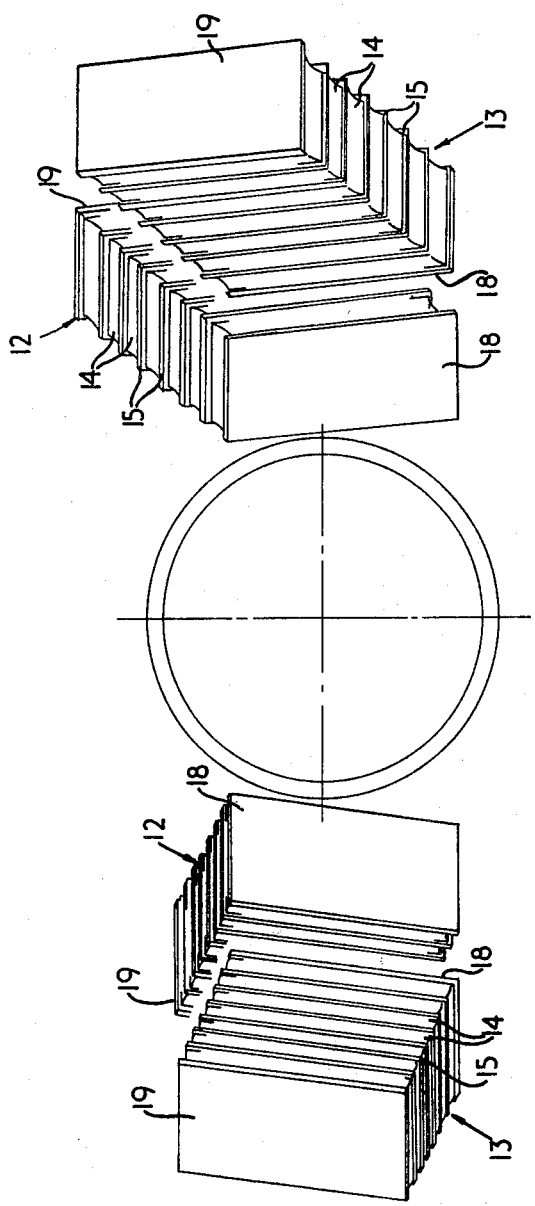

PATENTED AUG 1 1972 3,680,888

INVENTOR.
Archie J. Hirst
BY
Harness, Dickey & Pierce

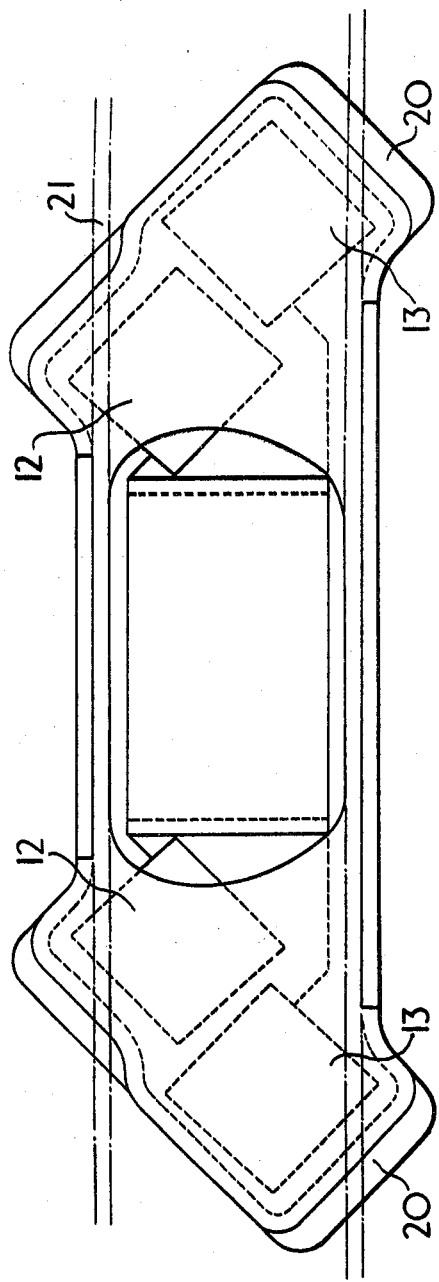

VEHICLE SUSPENSIONS

This invention relates to vehicle suspension of the type incorporating springs of the kind comprising a stack of resilient blocks, with parallel metal blocks interleaved between and bonded to the resilient blocks to produce a multi-layer resilient material and metal sandwich spring, successive blocks and plates being progressively displaced in a direction perpendicular to the direction of stacking of the blocks, so that the stack has an echelon profile.

The present invention is particularly concerned with the provision of a multi-spring suspension system such as for railway rolling stock, where certain requirements for longitudinal lateral and vertical stiffness occurs, but where space problems restrict the application of springs of the above described kind. Particularly, where equal longitudinal and lateral stiffness are required, there is not room for springs of sufficient size.

The present invention enables springs of the type having an echelon profile to be used in confined spaces by a particular displacement of the springs. Thus in accordance with one aspect of the invention a vehicle axle suspension unit comprises two pairs of resilient material and metal interleaved springs of the kind described above, arranged in longitudinally spaced relationship relative to the vehicle with one pair on each side of the axle box, one end of each spring being secured to a housing for association with a sprung portion of the vehicle the other end of each spring being attached to an associated axle box, the springs being disposed within the housing so that when viewed in plan each spring extends across an imaginary line drawn longitudinally with respect to the vehicle through the axle box, the springs of each pair overlapping when viewed along said line and the end of each spring secured to the housing being in a higher horizontal plane than the end attached to the associated axle box.

According to another aspect of the present invention a vehicle axle suspension system comprises at least two axle suspension units of the kind described in the preceding paragraph, the suspension units being arranged at axially spaced positions on the vehicle axle.

The invention will be understood by the following description of one embodiment by way of example only, as applied to a railway vehicle, in conjunction with the accompanying diagrammatic drawings, in which:

FIG. 2 is a sectional view of the line II—II of FIG. 1;

FIG. 3 is a side view, along the axis of the axle, illustrating the laden and unladen conditions of the springs;

FIG. 7 is a plan view in the direction of the arrow Y in FIG. 6.

Figure 1:
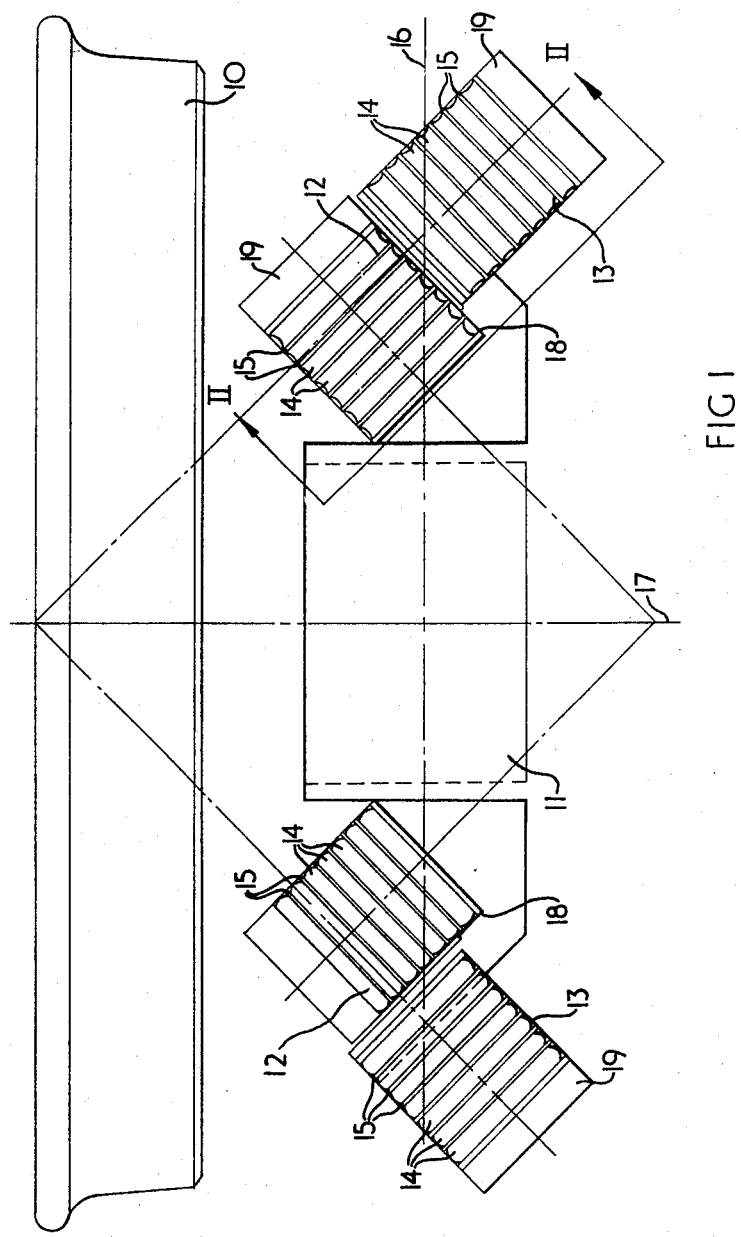
FIG. 1 is a plan view of a four-spring arrangement, with the axle housing omitted for clarity.

In the arrangement illustrated in FIG. 1, a wheel is indicated at 10, the axle box indicated generally at 11. On each side of the axle box 11 is arranged a pair of springs 12 and 13. Each spring comprises a stack of resilient blocks 14 having metal plates 15 interleaved between and bonded to the resilient blocks to produce a multi-layer interleaved resilient material and metal plate sandwich. The longitudinal axis of the axle box is indicated by the line 16 and the lateral axis by the line 17.

Attachment surfaces 18 and 19 (FIG. 2) are provided at each end respectively of each spring, surface 18 being attached to the axle box and the surfaces 19 to the housing (not shown in FIGS. 1 or 2). As will be seen from FIG. 1, the springs extend across the axis 16, and also overlap. As seen in FIG. 2 the surfaces 19, at which the springs are attached to the housing, are higher than the surfaces 18, at which the springs are attached to the axle box 11. The springs 12 and 13 at the right hand side of FIG. 1 are in an unladen condition while the springs at the left hand side are in a laden condition.

FIG. 3 illustrates the arrangement of the springs 12 and 13 relative to the axis of the axle, and wheel, the springs on the right in the unladen condition and the springs on the left in laden condition.

Figure 5:
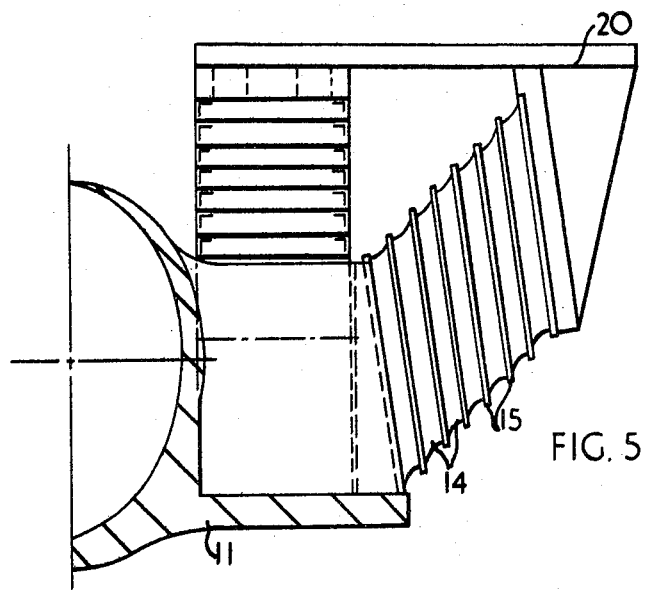
FIG. 5 is a view in the direction of arrow X in FIG. 4.
Figure 4:
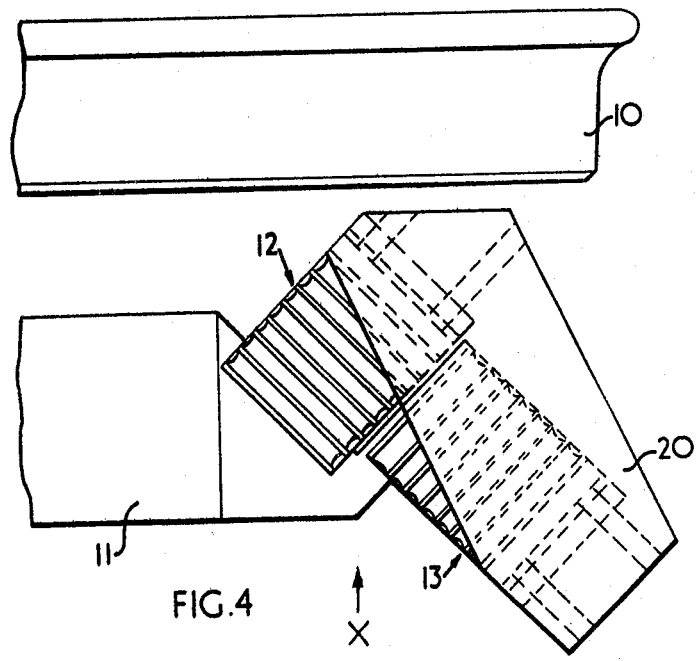
FIG. 4 is a similar view to that of FIG. 1, but with the mounting bracket of the housing included.

FIGS. 4 and 5 illustrate the attachment of mounting brackets 20 to the upper and outer ends of the springs. The brackets are attached to the springs on surfaces 19, the brackets in turn being attached to the housing (not shown in FIGS. 4 and 5).

Figure 6:
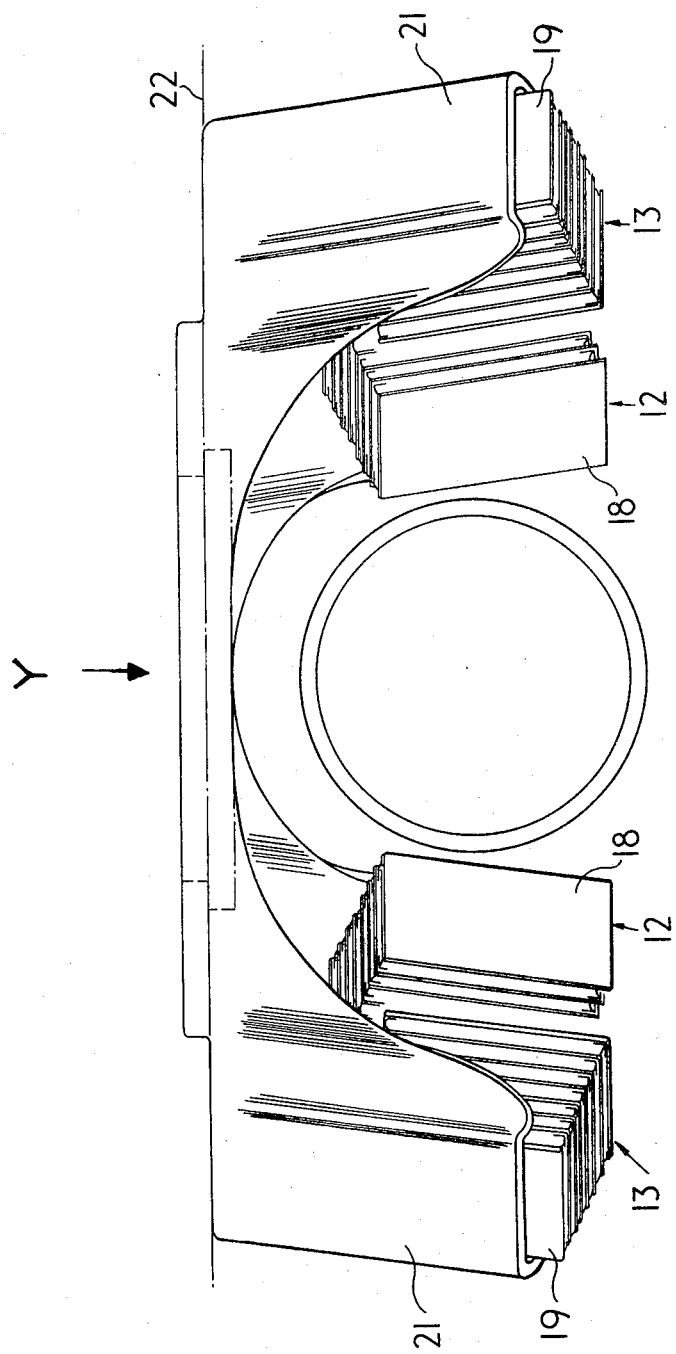
FIG. 6 is a side view, along the axis of the axle, illustrating the springs mounted in the axle housing but with the axle box omitted.

FIGS. 6 and 7 illustrate the mounting of the spring suspension system in an axle housing 21. The housing 21 is attached to the frame of the vehicle, the frame indicated at 21.

The attachment surfaces on the axle box 11 to which are attached the inner and lower ends of the springs 12 and 13, by their surfaces 18, are equally inclined with respect to the longitudinal and lateral axes 16 and 17. The attachment surfaces on the axle box are also inclined slightly upwardly with respect to the vertical.

The springs 12 and 13 are also equally inclined with respect of the longitudinal and lateral axes 16 and 17 and the common direction of displacement of their resilient blocks aligned substantially vertically. The ends by which the springs are attached to the housing lie in a horizontal plane which is higher than the plane of the ends attached to the associated axle box. Also the ends by which the springs are attached to the housing are spaced wider apart than the ends which are attached to the axle box.

The overlapping arrangement of the springs reduces the lateral dimensions of the suspension unit, for a particular size of spring. The greater the overlap the smaller the lateral dimensions, enabling a spring unit to be installed in the confined space normally available in the vicinity of a wheel and the associated axle box, and housing.

A suspension unit employing the spring arrangement described above has equal longitudinal and lateral stiffnesses and a vertical stiffness several times less than the longitudinal and lateral stiffnesses. The longitudinal lateral and vertical stiffnesses of the suspension unit can be varied considerably by simply altering the inclination of the springs to the longitudinal, lateral and vertical axes of the associated axle box, subject to the requirements that the individual spring units are equally inclined to the longitudinal axis of the associated axle box and equally spaced laterally from the longitudinal axis if unbalanced loadings are not to be applied to the axle box.

Suspension units of the kind described above are particularly useful for the use on railway rolling stack where two units are positions at axially spaced positions on each axle.

Having now described my invention, what I claim is:

1. A vehicle axle suspension unit comprising two pairs of resilient material and metal interleaved springs, each spring comprising a stack of resilient blocks having parallel metal plates interleaved between and bonded to the resilient blocks, successive blocks and plates progressively displaced in a direction perpendicular to the direction of stacking of the blocks to give an echelon profile, the pairs of springs being arranged in longitudinally spaced relationship relative to the vehicle with one pair on each side of the axle box, one end of each spring being secured to a housing for association with a sprung portion of the vehicle and the other end of each spring attached to an associated axle box, the springs being disposed within the housing so that when viewed in plan each spring extends across an imaginary line drawn longitudinally with respect to the vehicle through the axle box, the springs of each pair overlapping both when viewed along said line and when viewed transversely thereto, the end of each spring secured to the housing being in a higher horizontal plane than the end attached to the associated axle box whereby each spring is inclined to the vertical.

2. A vehicle axle suspension unit as claimed in claim 1, wherein the springs in each pair are symmetrically positioned either side of the imaginary longitudinal line.

3. A vehicle axle suspension unit as claimed in claim 1 wherein the inclination to the imaginary longitudinal line of the springs in a pair is equal.

4. A vehicle axle suspension unit as claimed in claim 1 wherein the vertical inclination of the springs in a pair is equal.

5. A vehicle axle suspension unit as claimed in claim 1 wherein the pairs of springs are positioned symmetrically either side of the rotational axis of the axle.

6. A vehicle axle suspension system comprising two axle suspension units as claimed in claim 1, the two units spaced axially on the vehicle axle.

* * * * *